United States Patent [19]

Scalise

[11] Patent Number: 5,511,919
[45] Date of Patent: Apr. 30, 1996

[54] LOCKING FASTENER

[76] Inventor: Dane C. Scalise, 223 South St., Apt. 2, Jamaica Plain, Mass. 02130

[21] Appl. No.: 285,644

[22] Filed: Aug. 3, 1994

Related U.S. Application Data

[63] Continuation-in-part of Ser. No. 970,773, Nov. 3, 1992, Pat. No. 5,362,187.

[51] Int. Cl.$^6$ .............................. F16B 19/00; F16B 21/00
[52] U.S. Cl. ........................ 411/555; 411/182; 411/509; 411/913; 411/553
[58] Field of Search ...................... 411/105, 107, 411/112, 182, 350, 549, 551, 553, 554, 555, 508, 509, 510, 913

[56] References Cited

U.S. PATENT DOCUMENTS

| | | |
|---|---|---|
| 808,867 | 1/1906 | Perry . |
| 817,536 | 4/1906 | Wendling . |
| 1,176,619 | 3/1916 | Sykes . |
| 1,259,214 | 3/1918 | Roja . |
| 1,480,839 | 1/1924 | Robinson . |
| 2,470,344 | 5/1949 | Dzus ........................................ 24/221 |
| 3,109,342 | 11/1963 | Disley .................................. 411/182 X |
| 3,407,454 | 10/1968 | Myatt ....................................... 24/221 |
| 3,656,466 | 4/1972 | Dzus, Jr. ................................ 123/198 E |
| 3,874,041 | 4/1975 | Smith .................................... 24/221 R |
| 4,040,463 | 8/1977 | Petrus ..................................... 411/182 |
| 4,067,090 | 1/1978 | Schenk ................................... 24/221 K |
| 4,276,806 | 7/1981 | Morel ......................................... 411/41 |
| 4,375,342 | 3/1983 | Wollar et al. ............................. 411/41 |
| 4,397,061 | 8/1983 | Kanzaka ....................................... 16/2 |
| 4,653,970 | 3/1987 | Ballantyne .............................. 411/555 |
| 4,761,860 | 8/1988 | Krauss ..................................... 24/142 |
| 4,777,704 | 10/1988 | Acker ..................................... 24/106 |
| 4,832,551 | 5/1989 | Wollar .................................... 411/280 |
| 4,874,276 | 10/1989 | Iguchi ...................................... 411/48 |
| 4,923,347 | 5/1990 | Moryl et al. ........................... 411/182 |
| 5,011,356 | 4/1991 | Fernandez ............................. 411/553 |
| 5,123,795 | 6/1992 | Engel et al. ........................ 411/553 X |

FOREIGN PATENT DOCUMENTS

| | | | |
|---|---|---|---|
| 791364 | 8/1968 | Canada .................................. 411/553 |
| 1004258 | 9/1965 | United Kingdom . |

*Primary Examiner*—Neill R. Wilson
*Attorney, Agent, or Firm*—Weingarten, Schurgin, Gagnebin & Hayes

[57] ABSTRACT

A fastening element is provided having a fastener body including a first side and a second side, with resilient locking prongs extending from one side of the fastener body. The fastener body can include either a cavity or a shank on one of the sides. The shank or cavity can be provided with either a channel or an engagement lug for mating with a complimentary fastening element. One side of the fastener body can also be provided with a cam surface or a resilient surface to inhibit rotation between mated complimentary fastening elements.

15 Claims, 9 Drawing Sheets

LOCKING FASTENER

RELATED APPLICATION

This application is a continuation-in-part of U.S. patent application Ser. No. 07/970,773, filed Nov. 3, 1992 U.S. Pat. No. 5,362,187.

FIELD OF THE INVENTION

The invention relates to a multiple piece fastener, and more particularly to a two-piece, releasably locking fastener for securing two objects together.

BACKGROUND OF THE INVENTION

Fasteners in seemingly endless varieties exist to attach one object to another. It is often desirable to effect a temporary connection between, for instance, separate pieces of fabric or leather having grommets, or between a tarpaulin and a truck bed. This connection may be effected by a temporary fastener, a permanent fastener having pieces affixed to each object to be joined, or by passing the fastener through the objects to be joined and into a substrate. The fastener can be used to form a one-time connection or be repeatedly engaged and disengaged.

Unfortunately, the need for permanent fasteners requires forethought and anticipation of a specific application. Additionally, permanent fasteners are exceedingly difficult to replace if defective or broken in use. A temporary fastener is a versatile alternative to the permanent fastener. The classic temporary, add-on fastener, a threaded bolt, nut, and washer, is easily replaced and provides a more secure attachment than a snap fastener for example, which is prone to "popping apart" under stress. However, nuts, washers, and bolts are easy to misplace when separated, and are relatively tedious and slow to connect. While add-on or aftermarket fasteners have a flexibility of use advantage over permanent fasteners, the features which make pieces of the fasteners easily securable to each item to be joined also make the pieces easy to lose, especially when the items are disconnected from each other.

An example of a specialized temporary fastener is U.S. Pat. No. 4,777,704 to Acker which teaches a snap fastener that uses a specialized grommet to attach layers of fabric to each other. However, in use, the pieces of the Acker device would be easily misplaced. U.S. Pat. Nos. 5,011,356 to Fernandez; 4,874,276 to Iguchi; 4,375,342 to Wollar et al.; and 4,276,806 to Morel each depict two-piece fasteners wherein a first fastening piece is anchored to a first object and is matable with a second fastening piece that secures a second object to the first object, but is not itself anchored to the second object in a manner that will prevent its disengagement or loss when the fastener is in a disengaged state.

Of the seemingly endless varieties of fasteners, there is no single fastener or combination of fasteners which simply and reliable join a plurality of annular members, such as eyelets, grommets or the like to one another. Further, the fastener art lacks fasteners that can be securely affixed to the members to be joined so that objects attached to the members can be connected and disconnected repeatedly without losing one or both of the fastening pieces.

SUMMARY OF THE INVENTION

The present invention provides a fastener of simple and inexpensive construction that has two pieces which easily attach and detach from each other for securing two members to each other, while remaining anchored to their respective members.

In one embodiment, a first piece including a bolt having resilient locking prongs extending from a collar and a shank having open-ended channels with locking slots is matable with a second piece. The second piece includes a nut body having a central cavity open to receive the shank of the bolt and resilient locking prongs. The cavity has engagement lugs disposed therein to mate with the channels and be locked within the locking slots. The collar can include a resilient surface or spring washer to maintain locking tension between the nut and the bolt which must be overcome to unlock them.

In another embodiment, a two-piece fastening system includes first and second members having holes therethrough. A first fastening piece includes a bolt having resilient locking prongs extending from a collar and further includes a shank having open-ended channels with locking slots is matable with a second fastening piece. The second fastening piece includes a nut body having a central cavity open to receive the shank of the bolt and resilient locking prongs. The cavity has engagement lugs disposed therein to mate with the channels and to be locked within the locking slots. The collar can include a resilient surface or spring washer to maintain locking tension between the nut and the bolt which must be overcome to unlock them. Insertion of the locking prongs of the bolt into the hole of the first members causes bolt shoulders to engage one side of the first member and the collar to engage the other, thereby anchoring the bolt to the first member. Insertion of the locking prongs of the nut into the hole of the second member causes the nut shoulders to engage one side of the second member and the nut body to engage the other, thereby anchoring the nut to the second member. Insertion of the shank into the cavity to cause the engagement lugs to lock into the locking slots locks the nut to the bolt and therefore the first member to the second member.

Another feature of the invention is a fastening element having a fastener body including a first side and a second side, with resilient locking prongs extending from one side of the fastener body. The fastener body can include either a cavity or a shank on one of the sides. The shank or cavity can be provided with either a channel or an engagement lug for mating with a complimentary fastening element. One side of the fastener body can also be provided with a cam surface or a resilient surface to inhibit rotation between mated complimentary fastening elements.

BRIEF DESCRIPTION OF THE DRAWINGS

These and further features of the invention will be better understood with reference to the accompanying specification and the drawings in which.

DETAILED DESCRIPTION OF THE INVENTION

Figure 1:
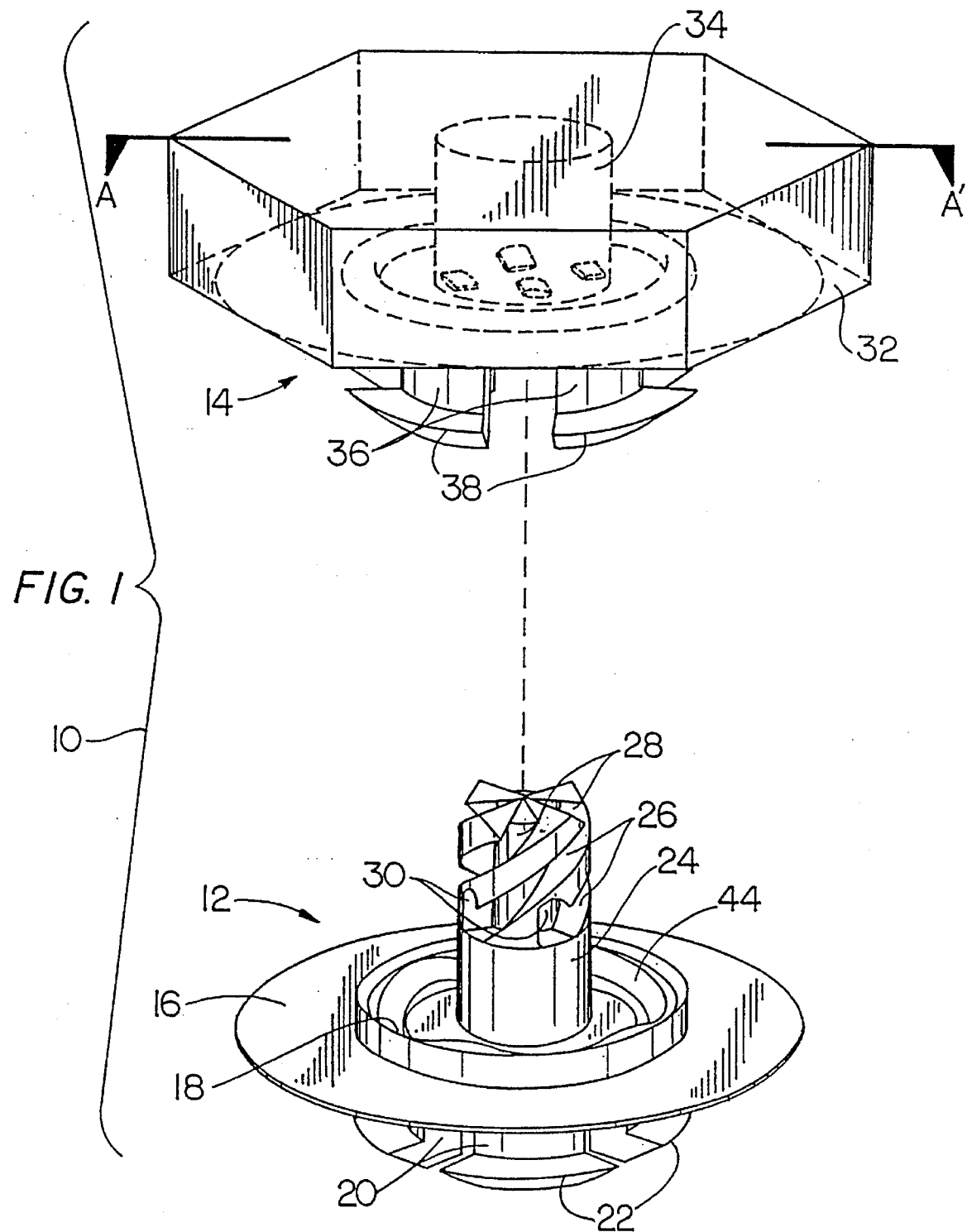
FIG. 1 is an exploded perspective view of the fastener of the invention having a nut and a bolt.

Referring to FIG. 1, an exploded perspective view of a fastener 10 is shown. The fastener has two pieces: a first fastening piece or bolt 12, and a second fastening piece or nut 14, each of which is a single piece of a resilient material such as plastic, a memory metal, a composite or the like.

The bolt 12 has a collar 16 which extends orthogonally outward from a central axis and includes a raised resilient surface 18. Resilient bolt locking prongs 20, attached to one side of the collar 16 at one end and having bolt shoulders 22 at the other end extend longitudinally from the collar 16. Each of the resilient bolt locking prongs 20 are sufficiently separated from each other so that they can be simultaneously pressed inward toward the central axis to reduce the circumference of the outermost edge of the bolt shoulders 22. A bolt shank 24 having channels 26 therein extends axially from the other side of the collar 16. Each of the channels 26 has an opening 28 at one end and a locking slot 30 at a second end for mating with the nut 14 as discussed hereinafter.

The nut 14 is comprised of a nut body 32 having a cavity 34 centrally disposed and accessible from the top and/or bottom of the nut body 32. In FIG. 1, the cavity 34 in the nut body 32 is only open from the bottom. Resilient nut locking prongs 36, extend longitudinally from the nut body 32 and are attached to the bottom of the nut body 32. The free end of each locking prong has a nut shoulder 38. Each of the resilient nut locking prongs 36 are sufficiently separated from each other so that they may be simultaneously pressed inward toward the central axis to reduce the circumference of the outermost edge of the nut shoulders 38. The nut locking prongs are also sufficiently separated from each other to permit passage of the bolt shank 24 into the cavity 34.

Figure 2:
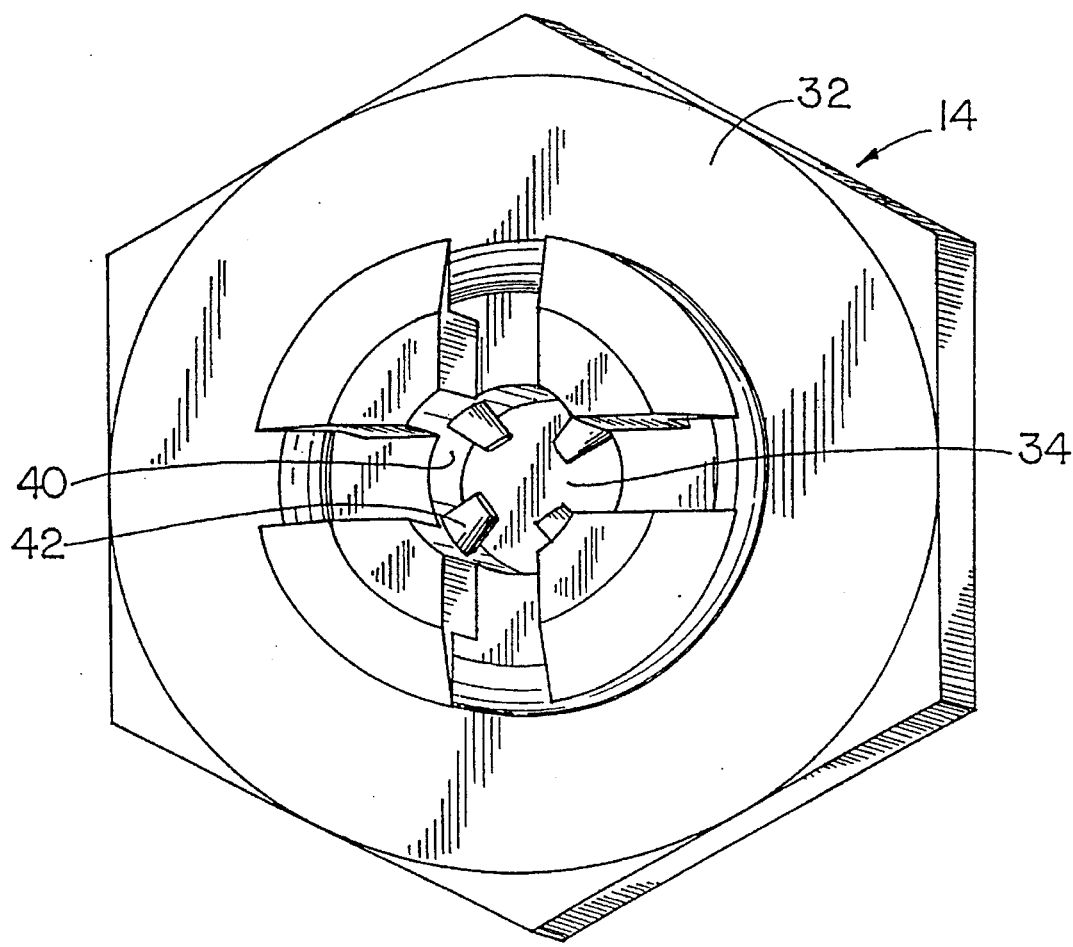
FIG. 2 is a perspective view of an interior cavity in the bolt of the fastener of FIG. 1.

FIG. 2 is a perspective view of the interior of the cavity 34 in the nut body 32 of FIG. 1. The cavity has a cylindrical side wall 40. Engagement lugs 42 project therefrom and are configured to be inserted into the opening 28 of the bolt shank 24, guided within the channels 26, and locked within the locking slots 30 when the nut 14 and bolt 12 are pressed together and rotated with respect to each other. With this configuration, the nut 14 and bolt 12 can be locked together with a 90 degree rotation. While four engagement lugs 42, channels 26, engagement lugs 42, and locking slots 30 are illustrated in FIGS. 1 and 2, other numbers of engagement lugs 42 are equally compatible with the concept of the invention. For example, the channels 26 can be axial with a bayonet type locking mechanism.

Figure 3:
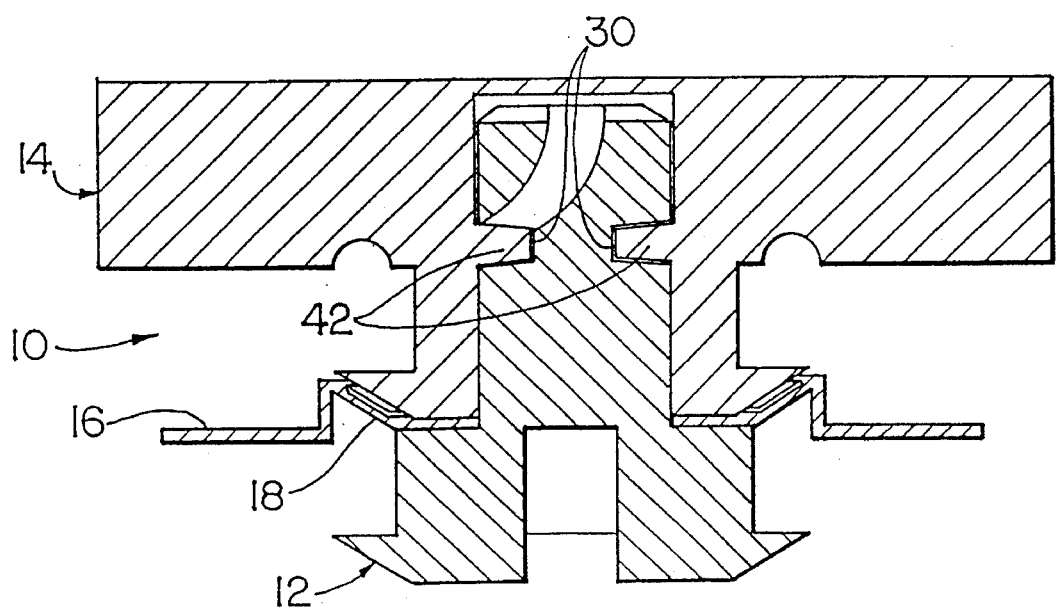
FIG. 3 is a side sectional view of the fastener of FIG. 1 taken along the line A—A' with the nut and bolt mated.

FIG. 3 is a side sectional view of the fastener 10 of FIG. 1 taken along the line A—A' with the nut 14 and bolt 12 mated. In this view, two of the engagement lugs 42 are shown locked in place within the locking slots 30. When the fastener 10 is mated, the nut shoulders 38 press against the resilient surface 18 of the collar 16 to provide a locking force that hold the engagement lugs 42 within an upper portion of the locking slots 30. If the nut 14 and bolt 12 are pressed together with sufficient force to overcome the locking force, the applied force is an unlocking force which deforms the resilient surface 18 enough to allow the engagement lugs 42 to disengage from the locking slots 30. The resilient surface 18 of the collar 16 can be supplemented or replaced by a spring washer 44 (shown in FIG. 1).

Figure 4:
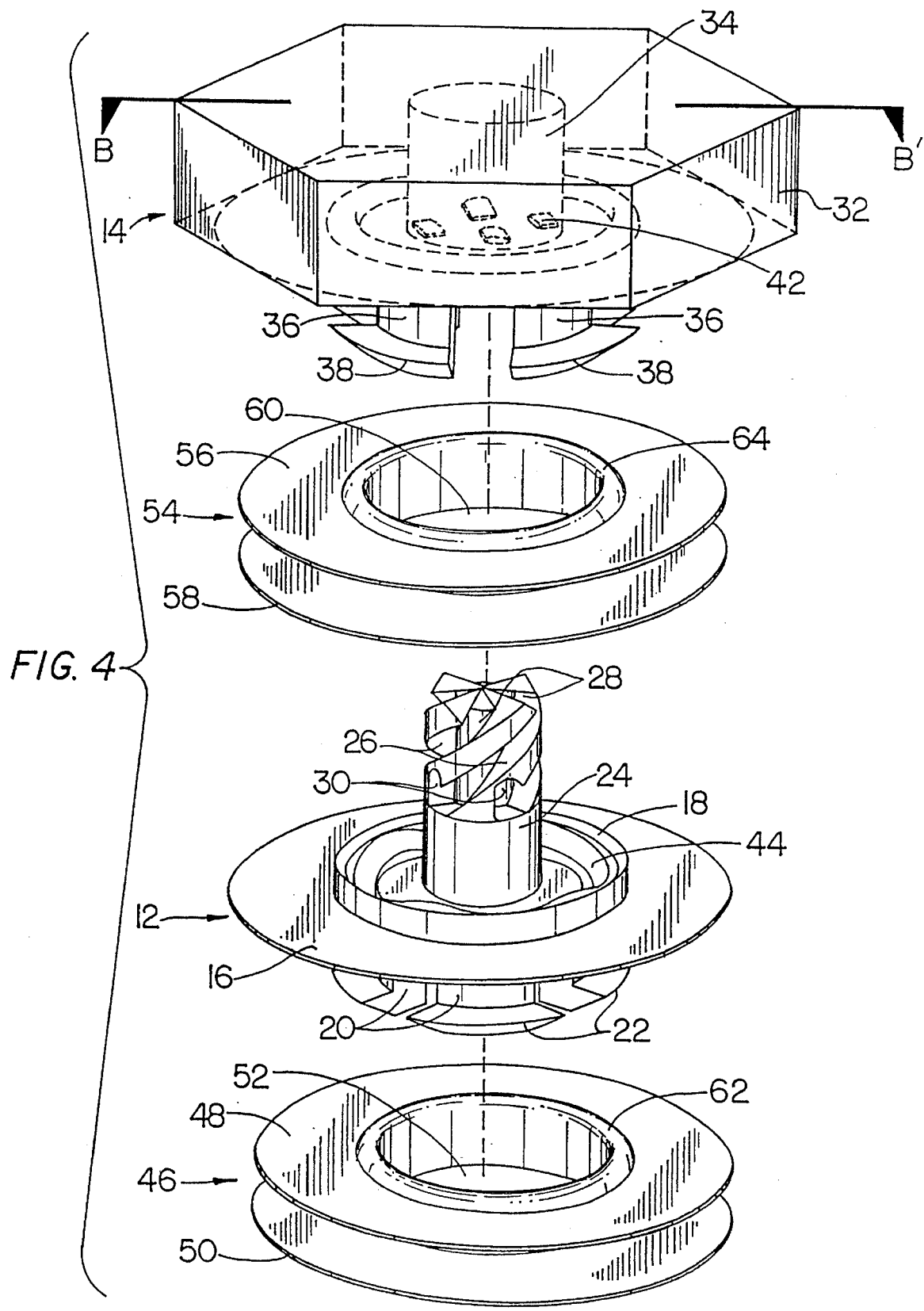
FIG. 4 is an exploded side view of the nut and bolt of FIG. 1 aligned with a first and second member to be joined.

FIG. 4 is an exploded side view of the nut 14 and bolt 12 of FIG. 1 aligned with a first member 46 having a first side 48, a second side 50, and a hole 52 therebetween; and a second member 54 having a first side 56, a second side 58, and a hole 60 therebetween. Although each member 46, 54 as shown, is a grommet, it will be appreciated that such members can be an annulus, eyelet, washer, panel, circuit board or the like, or any combination thereof. The fastener 10 can be dimensioned during fabrication for specific hole sizes or holes can be created in a particular surface in accordance with the dimension of the fastener 10. In the embodiment of FIG. 4, each grommet has a raised lip, 62 and 64, respectively.

Joining the first grommet 46 to the second grommet 54 with the fastener 10 is a simple multi-step procedure wherein each fastener piece is attached to a grommet following which the fastener pieces are mated. Specifically, the bolt 12 is axially aligned with the hole 52 in the first grommet 46. The bolt shoulders 22 are pressed against the first side 48 of the first grommet 46 so that the curvature of the bolt shoulders 22 causes the bolt locking prongs 20 to compress toward the central bolt axis thereby allowing bolt shoulders 22 of a greater circumference in their non-compressed state than the circumference of the hole 52 to be able to pass through the hole 52. Pushing the collar 16 adjacent the first side 48 of the first grommet 46 allows the bolt shoulders 22 to exit the hole 52 and decompress so that their circumference is greater than that of the hole 52 and so that the flat portion of the bolt shoulder 22 is adjacent the second side 50 of the first grommet 46. Thus, unless the bolt locking prongs 20 are recompressed, the bolt 12 is anchored to the first grommet 46.

The same procedure is then repeated for the nut 14 and the second grommet 54. Specifically, the nut body 32 is axially aligned with the hole 60 in the second grommet 54. The nut shoulders 38 are pressed against the first side 56 of the second grommet 54 so that the curvature of the nut shoulders 38 causes the nut locking prongs 36 to compress toward the central nut axis, thereby allowing nut shoulders 38 of a greater circumference in their non-compressed state than the circumference of the hole 60 to be able to pass through the hole 60. Pushing the nut body 32 adjacent the first side 56 of the second grommet 46 allows the nut shoulders 38 to exit the hole 60 and decompress so that their circumference is greater than that of the hole 60, and so that the flat portion of the nut shoulder 38 is adjacent the second side 60 of the second grommet 54. Thus, unless the nut locking prongs 38 are re-compressed, the nut 14 is anchored to the second grommet 54.

Locking the first grommet 46 to the second grommet 54 is accomplished by aligning the bolt shank 24 with the cavity 34 and pressing the nut 14 and bolt 12 toward each other. As the bolt shank 24 enters the cavity 34, the engagement lugs 42 enter the openings 28 in the channels 26. Rotating the nut 14 with respect to the bolt 12 causes the engagement lugs 42 to be guided through the channels 26 until the engagement lugs 42 approach the locking slots 30. As the nut 14 and bolt 12 move together, the nut shoulders 38 press against the resilient surface 18 or spring washer 44 of the collar 16 and a compressive force overcomes the resistance of the resilient surface 18 or the spring washer 44, thereby allowing the engagement lugs 42 to enter the locking slots 30. Once the engagement lugs 42 are in place in the locking slots 30, they are held in position by the tension created between the resilient surface 18 or locking washer 44 and the nut shoulders 38, unless a compressive unlocking force is applied to the bolt 12 and nut 14 which allows the engagement lugs 42 to disengage from the locking slots 30.

Figure 5:
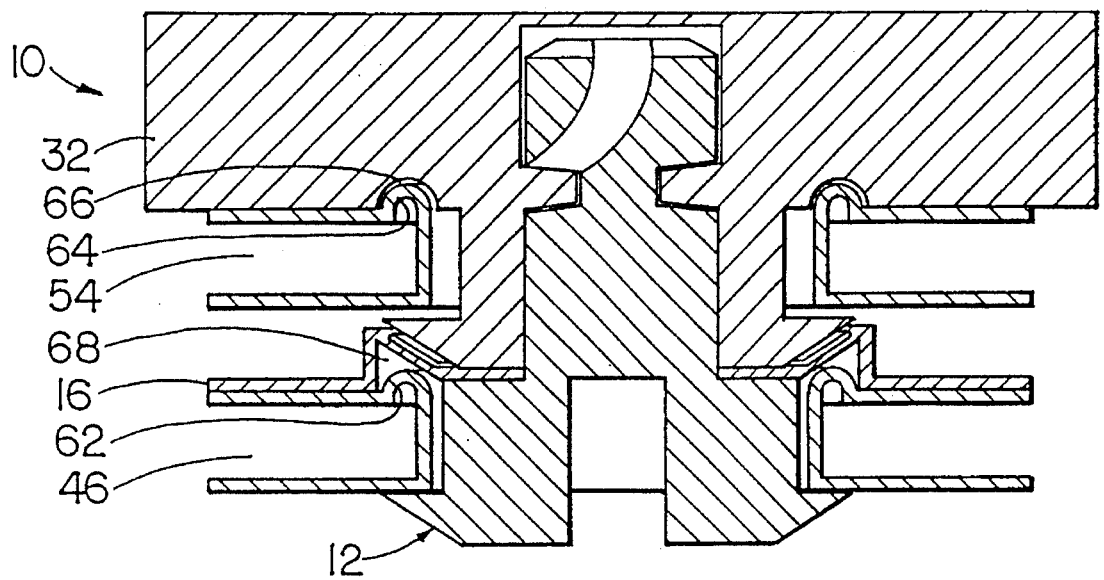
FIG. 5 is a side sectional view of the mated fastener and joined members of FIG. 4 taken along the line B—B'.

Referring to FIG. 5, a side sectional view of the mated fastener 10 and joined members 46, 54 of FIG. 4 is shown taken along the line B—B'. In this view the nut body 32 is shown with an optional contoured grove 66 for covering the lip 64 of the second grommet 54 to allow the nut body 32 to lie flush over the remainder of the second grommet 54, and for preventing a pressure point against the nut body 32 which could cause it to crack. A similar feature is shown in the bolt 12, wherein the collar 16 has a hollow area 68 under the raised resilient surface 18 for receiving the lip 62.

Figure 6:
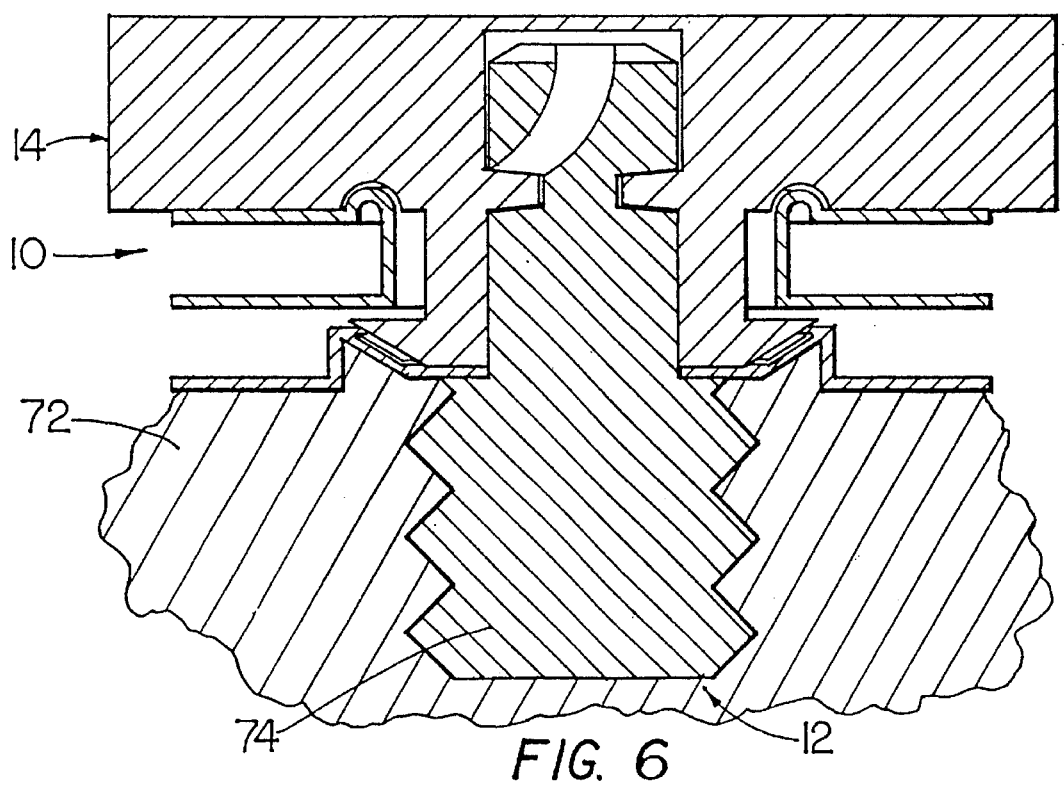
FIG. 6 is a side sectional view of a mated fastener having a bolt with a threaded base.

The fastener 10 is also very useful for securing a member 70 to a fixed substrate 72 as illustrated is FIG. 6, wherein a side sectional view of a mated fastener 10 having a bolt 12 with a threaded base 74 is shown. The threaded base 74 screws into the substrate and forms a fixed anchor to which the bolt 14 is mated.

Although a two-piece fastener is described herein as an exemplary embodiment according to the invention, one of ordinary skill in the art will appreciate that a fastener according to the invention can be implemented having a greater number of pieces such as three or more.

While a nut portion of the fastener is described and illustrated herein as an hexagonal nut, it will be appreciated that other configurations can be implemented in a fastener according to the invention, including other geometric configurations, i.e. octagonal or square, and wing-nut-like implementations, or the like. Further, while the channels on the bolt shaft herein are described and illustrated as arcuate or curved channels, it will be appreciated that such channels could be straight or otherwise inclined.

It will be further appreciated, among other things, that although the engagement lugs are disposed on the nut portion of the exemplary fasteners described, and the arcuate or curved channels are disposed on the bolt shank in the illustrative embodiments, the channels can alternatively be integrated with the nut portion and the engagement lugs disposed on the bolt shank.

The many features of the present invention can be combined in various manners to provide complimentary locking fasteners in numerous configurations, to include having either a cavity or a shank on one of its sides, and the shank or cavity having either a channel or an engagement lug for mating with a complimentary fastening element.

Figure 7:
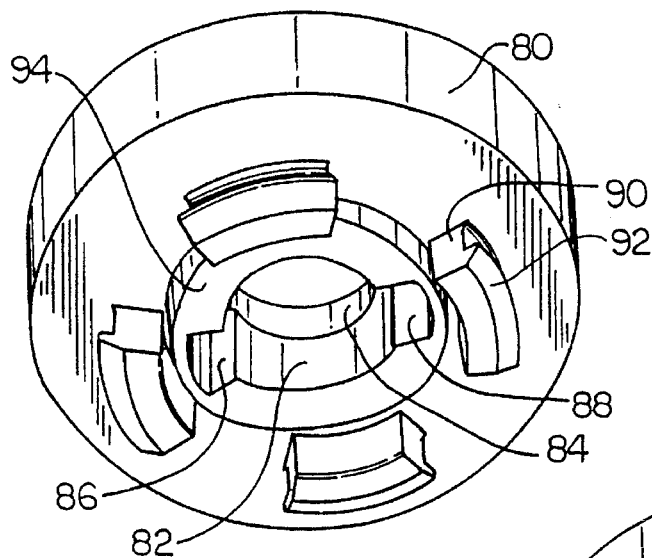
FIG. 7 is a perspective view of an alternative fastening element, configured as a nut.

For example, FIG. 7 illustrates a fastening element similar to the second fastening piece or nut 14 illustrated in FIG. 1. The fastening element comprises a fastener body 80 having a bore therethrough. A first portion of the bore 82 has an inner diameter less than the diameter of a second portion of the bore 84. The first portion of the bore 82 is further provided with a number of slots through which engagement lugs on a shank are insertable, the number and dimensions of the slots corresponding to the number and dimensions of the engagement lugs. In the illustrated embodiment, two slots 86 and 88 are shown. The fastener body 80 further includes resilient locking prongs 90, having a sloped surface 92 at their free end, extending from one side of the fastener body. In the illustrated embodiment, four resilient locking prongs 90 are provided and the sloped surface 92 is outward facing with respect to the center of the fastener body 80. One side of the fastener body can also be provided with a cam surface 94. The cam surface 94 can be either resilient or non-resilient.

Figure 8:
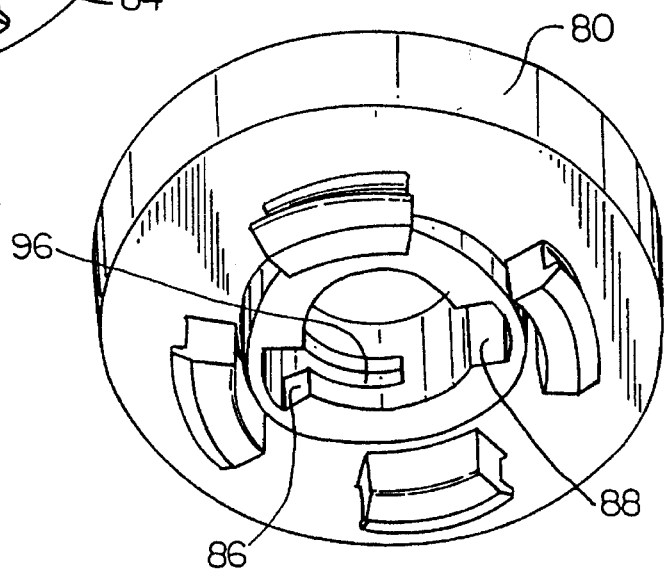
FIG. 8 is a perspective view of another alternative fastening element, configured as a nut.

FIG. 8 illustrates an alternative embodiment of the fastening element shown in FIG. 7, wherein the bore through the fastening body has a substantially uniform inner diameter. In addition to the slots 86 and 88, a locking channel is provided in communication with each respective slot to provide an angled passage. In the illustration, only a single locking channel 96 is visible.

Figure 9:
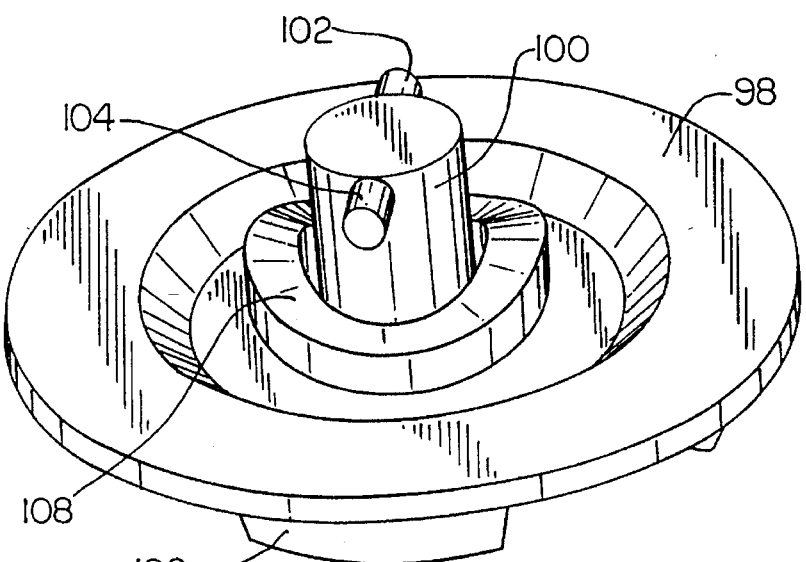
FIG. 9 is a perspective view of an alternative fastening element, configured as a bolt.

FIG. 9 illustrates another embodiment of the fastening element that is configured to compliment the fastening element of FIGS. 7 and 8. In this embodiment, a fastening element is configured as a bolt and includes a fastener body 98 having a shank 100 extending from one of its sides. Two engagement lugs 102 and 104 protrude from the free end of the shank 100. However, the engagement lugs 102 and 104 can be located at other positions on the shank and they do not have to have the shape illustrated. The fastener body 98 further includes resilient locking prongs, having a sloped surface at their free end, extending from one side of the fastener body. In the illustrated embodiment, an outwardly facing sloped surface 106 of one resilient locking prong is visible. One side of the fastener body can also be provided with a cam surface 108 which can be either resilient or non-resilient.

When the fastening element of FIG. 7 is mated to a complimentary fastening element, such as is represented in FIG. 9, the engagement lugs 102 and 104 are passed through the slots 86 and 88 until the engagement lugs are clear of the slots and one or both of the fastening pieces are rotated with respect to each other. The rotation moves the engagement lugs 102 and 104 away from the slots 86 and 88, and onto the shelf or ledge provided at the point where the first portion of the bore 82 meets the second portion of the bore 84. Once complimentary fastening elements are thus mated, rotation between the respective fastening elements is inhibited by the cam surfaces 94 and 106.

When the fastening element of FIG. 8 is mated to a complimentary fastening element, such as is represented in FIG. 9, the engagement lugs 102 and 104 are passed through the slots 86 and 88 until the engagement lugs are aligned with the locking channels 96 and one or both of the fastening pieces are rotated with respect to each other. The rotation moves the engagement lugs 102 and 104 away from the slots 86 and 88, and into the locking channels 96. Once complimentary fastening elements are thus mated, rotation between the respective fastening elements is inhibited by the cam surfaces 94 and 108.

It should be noted, however, that although both the cam surface and an opposing abutment surface can be resilient, both surfaces cannot be non-resilient. By at least one of the cam and the abutment surface being resilient, the need for a spring to provide tension between the fastening elements, as described with respect to FIG. 1, is eliminated. Additionally, the cam surface can be integral with the fastening element or be a separable element.

Figure 10:
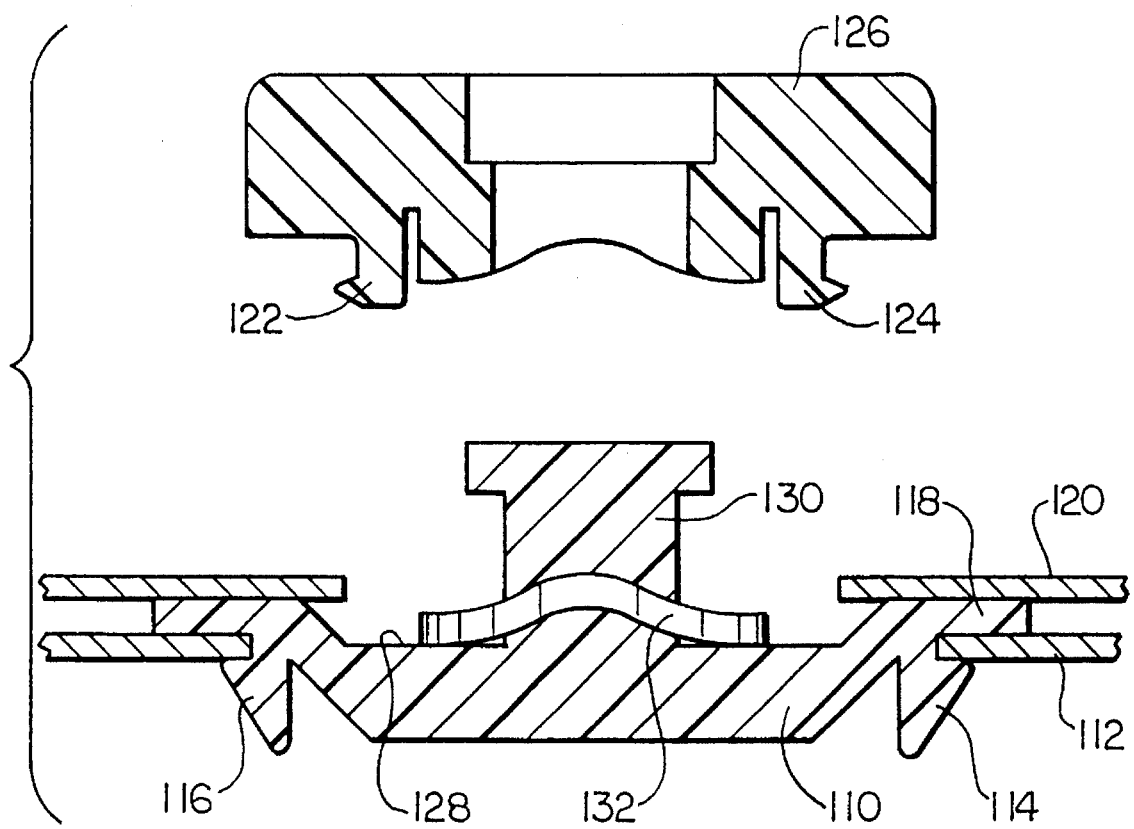
FIG. 10 is a side sectional view of a pair of matable fastening elements.

FIG. 10 illustrates some of the advantages of the features of the fastening elements described above in use. A side sectional view of a first fastening element 110 engaged with a first panel 112, having an aperture therethrough, by resilient locking prongs 114 and 116 is shown. A portion of the fastener body 118 has a thickness selected to provide a predetermined spacing or offset between the first panel 112 and a second panel 120. Locking prongs 122 and 124 of a second fastening element 126 engage the second panel 120 as the second fastening element is mated to the first fastening element 110. Another feature of the first fastening element 110 is a depressed surface 128 around a shank 130 and cam surface 132 that defines a hollow into which the locking prongs of the second fastening element 126 are received.

Figure 11:
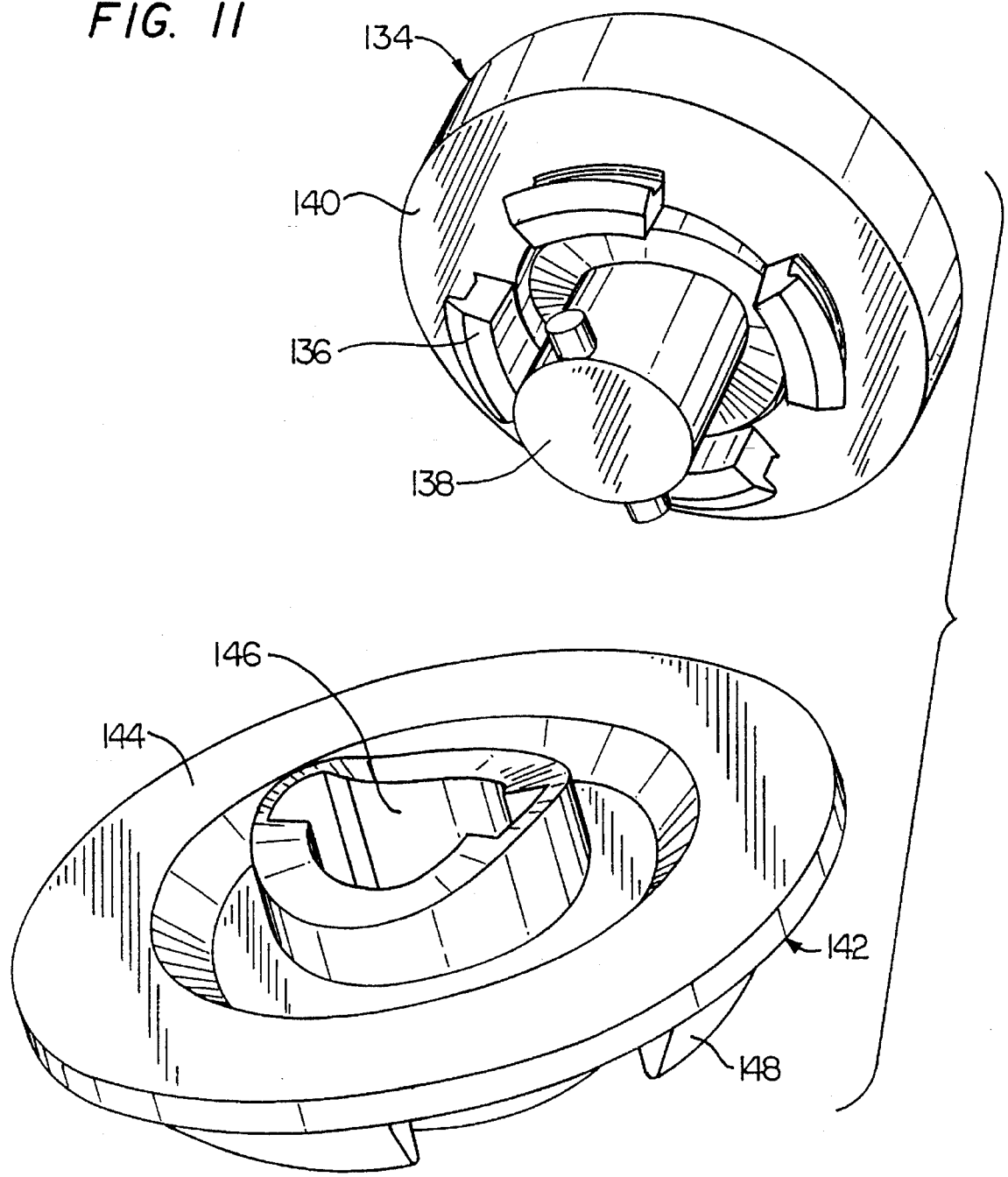
FIG. 11 is a perspective view of an alternative pair of matable fastening elements.

FIG. 11 is a perspective illustration of yet another configuration of compatible fastening elements in accordance with the invention. In this configuration, a first fastening element 134 is provided with at least one locking prong 136 and a shank 138 on the same side of the fastener body 140. A second fastening element 142 includes a fastener body 144 defining a cavity 146 for receiving the shank 138 through an opening on a first side of the fastener body, whereas at least one locking prong 148 extends from a second side of the fastener body. Although the shank 138 is longer than the locking prongs 136 of the first fastening element in this embodiment, in other embodiments the shank can be shorter than the locking prongs if the second fastening element is appropriately configured.

Figure 12:
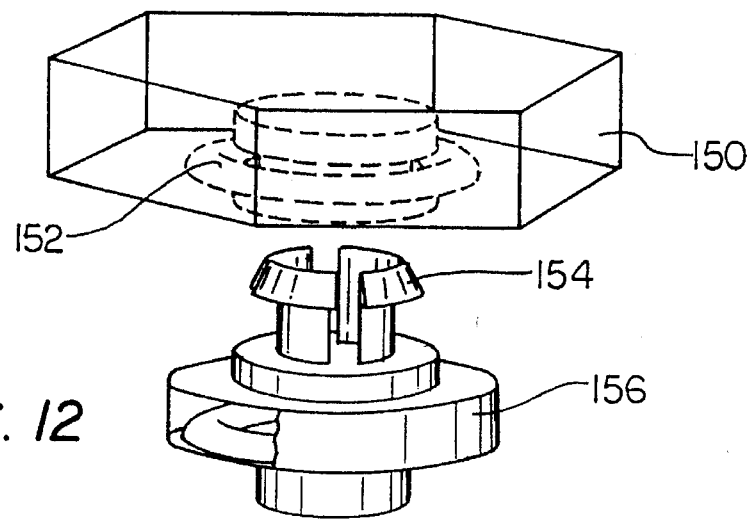
FIG. 12 is a perspective view of a pair of matable fastening elements.

FIG. 12 illustrates yet another pair of compatible fastening elements of the invention. A first element 150 includes an opening on one leading to a cavity having a recess 152 adapted to receive the end portions of locking prongs 154 of a second element 156.

Figure 13:
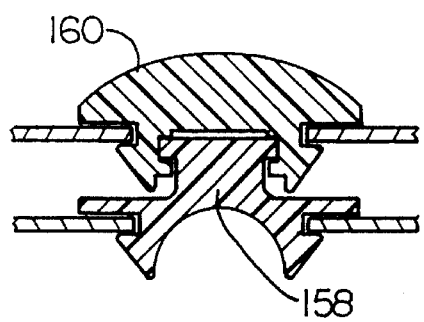
FIGS. 13–15 are side sectional views of mated fastening elements in accordance with the invention.
Figure 14:
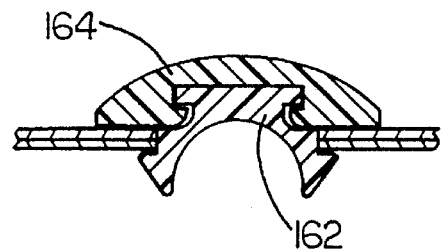
Figure 15:
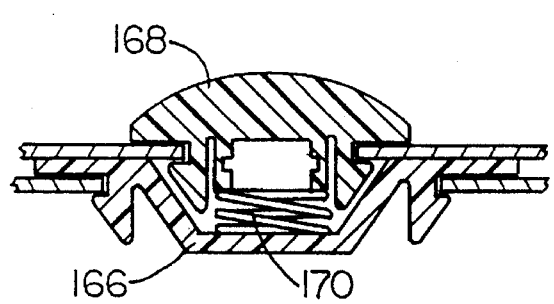

FIGS. 13 through 15 are side sectional views of additional configurations of the fastening element of the invention and are shown mated in association with panels.

FIG. 13 illustrates a bolt element 158 and a nut element 160 configured to provide greater offset between panels than the that provided by the fastening elements shown in FIG. 10.

FIG. 14 illustrates a bolt element 162 and a nut element 164 configured to provide less offset between panels than the that shown in FIG. 10.

FIG. 15 illustrates a bolt element 166 and a nut element 168 pushed apart by a helical spring 170 to inhibit relative rotation of the elements.

Figure 16:
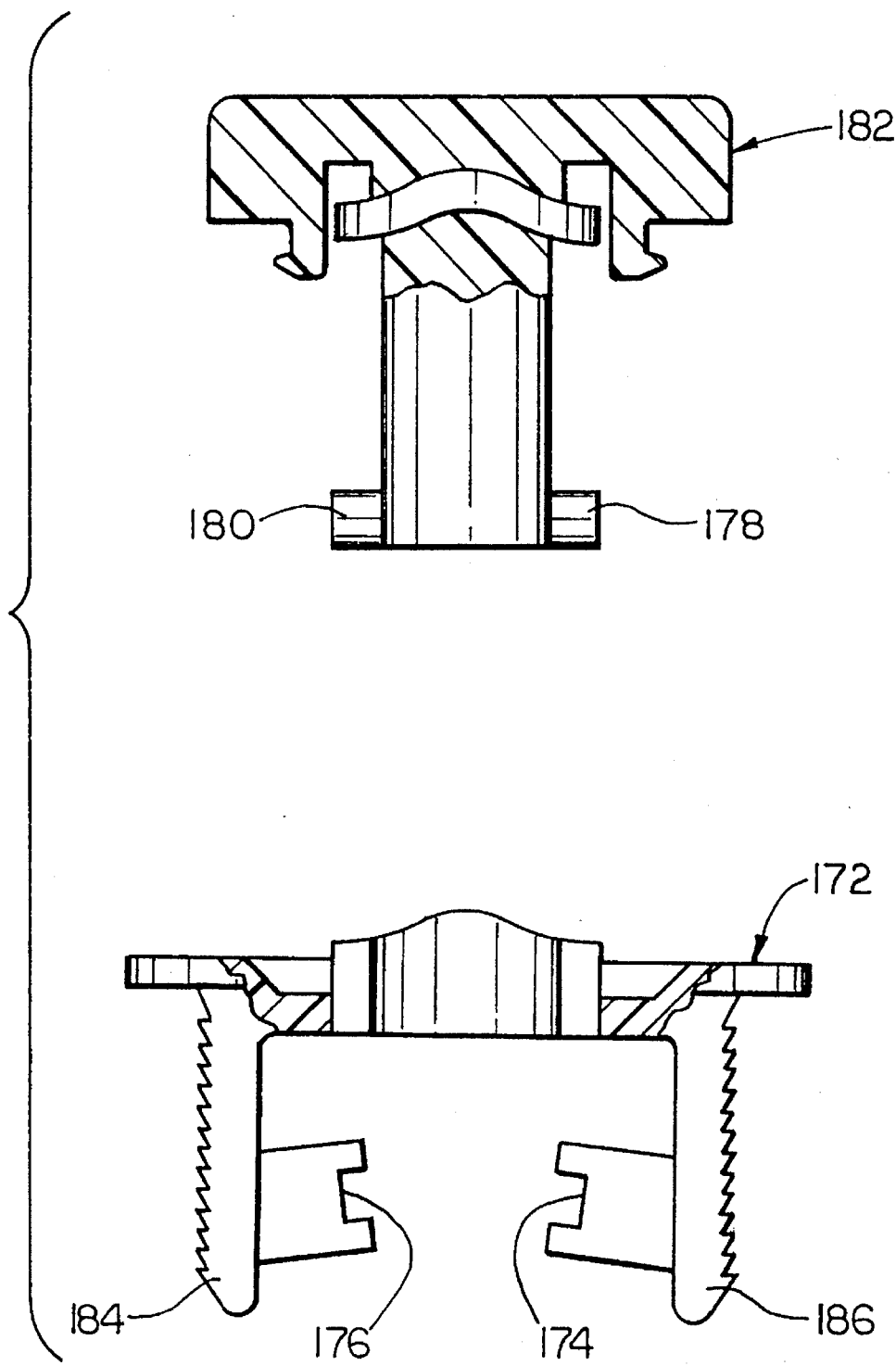
FIG. 16 is a side sectional view of yet another pair of matable fastening elements in accordance with the invention.

FIG. 16 illustrates a nut element 172 having channels 174 and 176 for engaging lugs 178 and 180 of a bolt element 182. In this embodiment, each locking prong 184 and 186 has an outwardly facing ridged surface.

Figure 17:
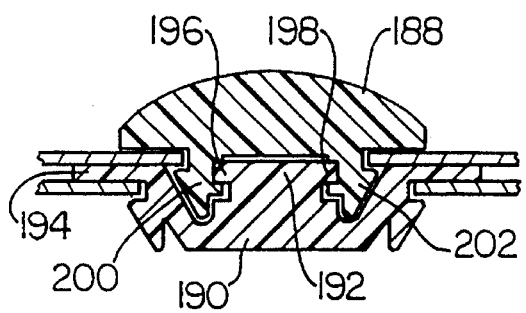
FIG. 17 is a side sectional view of still another pair of matable fastening elements in accordance with the invention.

FIG. 17 illustrates a first fastening element 188 mated to a second fastening element 190. In the illustrated embodiment, the second fastening element 190 is provided with a shank 192 having an uppermost end that does not extend further than a plane defined by the upper surfaces of a collar portion 194, and engagement lugs 196 and 198. A hollow or recess surrounds the shank 192. The first fastening element 188 is provided with locking prongs 200 and 202, but does not have a cavity except for that defined by the locking prongs 200 and 202 which include channels for receiving the engagement lugs 196 and 198. This configuration permits the first fastening element 188 to have a very low profile with respect to the surface it is secured to. In an alternative embodiment, a shank is provided with channels for receiving engagement lugs disposed on the inwardly facing surface of locking prongs.

While illustrative embodiments according to the invention are described and illustrated herein having annular features for engagement with grommets, eyelets, washers, circular openings, and the like, it will be appreciated that a fastening system can be implemented according to the invention wherein other geometries are incorporated, such as square or rectangular features.

Although the invention has been shown and described with respect to exemplary embodiments thereof, various other changes, omissions and additions in form and detail thereof may be made therein without departing from the spirit and scope of the invention.

What is claimed is:

1. A fastening element comprising:

a fastener body having a first side and a second side; and a plurality of resilient locking prongs extending from said first side of said fastener body, each of said locking prongs including a surface having a slope;

said fastener body defining a cavity open to one of said first side and said second side of said fastener body;

said fastener body further including a cam surface on one of said first side and said second side of said fastener body.

2. A fastening element comprising:

a fastener body having a first side and a second side; and a plurality of resilient locking prongs extending from said first side of said fastener body, each of said locking prongs including a surface having a slope;

said fastener body defining a cavity open to one of said first side and said second side of said fastener body;

said fastener body further including a resilient surface on one of said first side and said second side of said fastener body.

3. A fastening element comprising:

a fastener body having a first side and a second side; and a plurality of resilient locking prongs extending from said first side of said fastener body, each of said locking prongs including a surface having a slope;

said fastener body defining a cavity open to one of said first side and said second side of said fastener body;

said fastener body further including an engagement lug projecting into said cavity.

4. A fastening element comprising:

a fastener body having a first side and a second side; and a plurality of resilient locking prongs extending from said first side of said fastener body, each of said locking prongs including a surface having a slope;

said fastener body defining a cavity open to one of said first side and said second side of said fastener body;

said fastener body further includes a channel accessible from said cavity.

5. The fastening element of claim 4, wherein said channel includes locking slot.

6. A fastening element comprising:

a fastener body having a first side and a second side; and a plurality of resilient locking prongs extending from said first side of said fastener body, each of said locking prongs including a surface having a slope;

said fastener body has a shank extending from one of said first side and said second side of said fastener body, said shank being fixed to said fastener body.

7. The fastening element of claim 6, further including a cam surface on one of said first side and said second side of said fastener body.

8. The fastening element of claim 7, wherein said cam surface surrounds a base portion of said shank.

9. The fastening element of claim 6, further including a resilient surface on one of said first side and said second side of said fastener body.

10. The fastening element of claim 6, said fastener body further including an engagement lug protruding from said shank.

11. The fastening element of claim 6, wherein said shank is surrounded by locking prongs and is longer than said locking prongs.

12. The fastening element of claim 6, wherein said fastener body further includes a channel accessible from a surface portion of said shank.

13. The fastening element of claim 6, wherein said channel includes a locking slot.

14. A fastening element, comprising:
   a fastener body having a first side and a second side;
   a shank integral with said fastener body and extending from one of said first side and said second side of said fastener body;
   a plurality of resilient locking prongs integral with said fastener body and extending longitudinally from one of said first side and said second side of said fastener body, each of said plurality of resilient locking prongs including an outwardly facing surface having a slope; and
   a cam surface on one of said first side and said second side of said fastener body.

15. A fastening element, comprising:
   a fastener body having a first side, a second side, and a cavity defined by said fastener body, said cavity accessible from at least one of said first side and said second side;
   a plurality of resilient locking prongs integral with said fastener body and extending longitudinally from one of said first side and said second side of said fastener body, each of said plurality of resilient locking prongs including an outwardly facing surface having a slope; and
   a cam surface on one of said first side and said second side of said fastener body.

* * * * *